No. 639,209. Patented Dec. 19, 1899.
W. E. S. BUNN & E. J. CASE.
MANUFACTURE OF LEAD OXID.
(Application filed June 24, 1898.)
(No Model.)
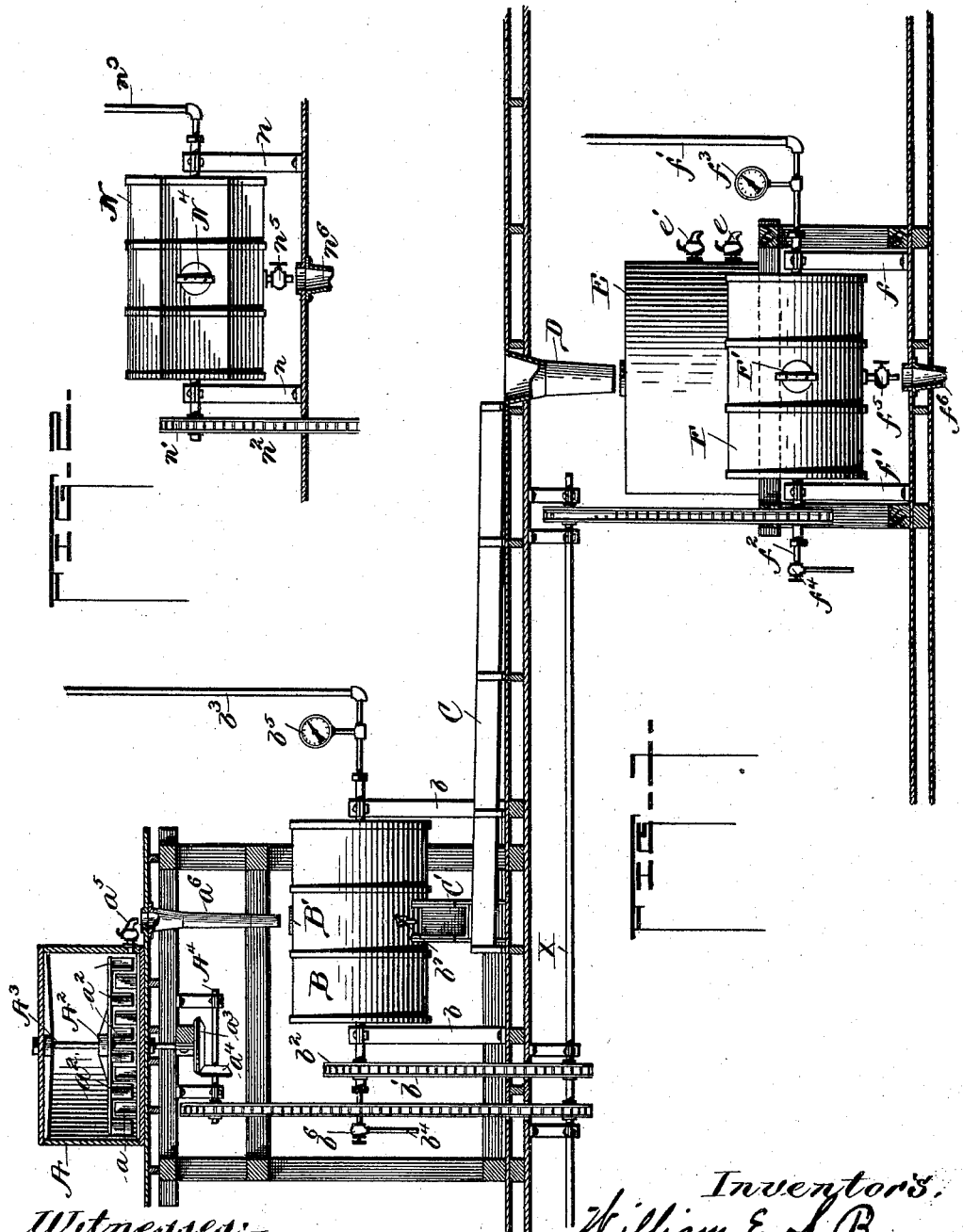

UNITED STATES PATENT OFFICE.

WILLIAM E. S. BUNN AND ENSLEY J. CASE, OF PEORIA, ILLINOIS.

MANUFACTURE OF LEAD OXID.

SPECIFICATION forming part of Letters Patent No. 639,209, dated December 19, 1899.

Application filed June 24, 1896. Serial No. 596,811. (No model.)

*To all whom it may concern:*

Be it known that we, WILLIAM E. S. BUNN and ENSLEY J. CASE, citizens of the United States, residing at Peoria, in the county of Peoria and State of Illinois, have invented certain new and useful Improvements in Processes of and Apparatus for Making Lead Oxids and White Lead; and we do hereby declare that the following is a full, clear, and exact description of the invention, which will enable others skilled in the art to which it appertains to make and use the same.

Our invention relates to the production or manufacture of white lead and lead oxid by a process in which coarse particles of lead are mixed with water and agitated in an open tub or other suitable receptacle and the lead by attrition caused by agitation is reduced to a comminuted condition, the lead particles after such reduction being held in suspension in the water, and the mixture of lead and water is passed to a revoluble cylinder or other suitable agitating-receptacle, and it is exposed to a rolling or tumbling motion in the presence of compressed air within the said cylinder or other suitable receptacle provided for containing the mixture to produce lead oxid or litharge, and when it is desired to produce white lead the lead-oxid product is passed through a flume or other suitable mechanical means that may be provided for the purpose of separating metallic lead from the lead oxid as the mixture flows therethrough, and the said mixture is conducted thence into a settling-tank and after being allowed to stand for a period of time is taken therefrom and deposited in a second revoluble cylinder or other suitable agitating container, where the lead oxid, which is still mixed with water, is again subjected to a rolling or tumbling motion in the presence of carbon dioxid under compression in the cylinder or container, which converts the lead oxid into lead carbonate, which is the basis of white lead.

Our invention therefore consists in the reduction of metallic lead to a comminuted state by friction when mixed with water and agitated, the subjecting of these particles of metallic lead held in suspension in a body of water to the action of atmospheric air under compression within a cylinder or suitable container which will produce litharge or lead oxid, and extending the process when it is desired to reduce the lead-oxid product to white lead. The invention under such circumstances further consists in the passing of the lead oxid, mixed with water to cause it to flow freely, through a flume or other suitable separator for abstracting the metallic lead that has not been chemically acted upon from the lead oxid, the depositing of the flow through the flume or separator into the settling-tank and allowing it to stand for a period of time for the purpose of separating the lead oxid from the water or a portion thereof, and the subjecting of the oxid taken from the settling-tank and mixed with water to the action of carbon dioxid under compression within a cylinder or other suitable receptacle within which the mixture is being agitated and during the period of such agitation to produce lead carbonate.

In the accompanying drawings we illustrate an apparatus adapted to carry out our invention into practical effect.

In said drawings, Figure 1 shows in elevation the complete apparatus above referred to. Fig. 2 shows a modified form of a portion of the complete device.

In the construction shown in the aforesaid drawings, A is a stationary tub, which is shown as supported by a suitable frame.

$a\ a\ a\ a$ are stationary agitators which are auxiliary to the movable agitators $a^2$, which are fixed to the revolving frame $A^2$ and form a sort of rake, said rake being fixed upon the revolving shaft $A^3$, which is properly journaled in the framework of the tub A. The agitators $a$ and $a^2$, which are respectively stationary and movable, are set at angles with each other—that is, the stationary with the movable agitators—and arranged to augment agitation and to increase the friction of the parts of the mixture designed to be contained therein.

$a^3$ is a bevel cog-wheel on shaft $A^3$, and $a^4$ is a bevel cog-wheel on shaft $A^4$, the said shaft $A^4$ being provided with a suitable sprocket-wheel and is connected with the line-shaft X by means of a suitable sprocket-chain, whereby the rake $A^2$ is revolved within the tub A. The interior of the tub may be provided with any auxiliary parts that may be deemed necessary to carry out the process.

In Fig. 2 of the drawings we have shown another form of reducer, which we may use to take the place of the tub A, if we desire. Referring to the said drawing, N is a hexagonal horizontally-disposed revoluble receptacle having auxiliary trunnions in the standards $n\ n$. $n'$ is a sprocket-wheel on one of the trunnions, and $n^2$ is a sprocket-chain for conveying a rotary motion thereto and to the receptacle N from a line-shaft with which it may be connected; but the rotary motion may be imparted in any suitable and well-known manner. $n^3$ is a water-pipe leading into the receptacle N through one of the trunnions, which is purposely made hollow to admit the same. $N^4$ is a man-head in the same receptacle. $n^5$ is a stop-cock provided with an outlet for the mixture contained in the receptacle, and $n^6$ is a spout immediately below the receptacle N. The interior of this receptacle N may be provided with any stirring means that may be deemed necessary to carry out the process successfully.

Referring again to Fig. 1, $a^5$ is a stop-cock provided as an outlet for the mixture contained in the tub, and $a^6$ is a spout immediately below the said stop-cock and designed to receive the flow therefrom and from the cock $a^5$.

B represents a horizontally-arranged cylinder or drum, of wood or metal, as desired, provided with axle-trunnions, by which it is journaled in the end standards $b\ b$, rotary motion being imparted to the cylinder by means of the sprocket-chain $b'$, which connects sprocket-wheel $b^2$ on one of the trunnions with a sprocket-wheel on the line-shaft X or in any suitable and well-known manner.

B' is a manhole in the circumference of the cylinder for access into the interior of the same and through which the mixture of comminuted lead and water from the tub A is passed into the cylinder B. This supply can be introduced into said cylinder before the starting of the apparatus, and subsequent supplies may be added in the same manner when the cylinder is stationary, or the supply may be added automatically by means of any suitable feeding mechanism. The interior of the cylinder may be provided with any stirring means that may be deemed necessary to carry out the process successfully.

$b^3$ is an air-induction pipe, and $b^4$ is an air-eduction pipe, the trunnions of the cylinder being made hollow to admit said pipes. The air-induction pipe $b^3$ is connected with a suitable air-compressor. $b^5$ is a gage connected with the air-pipe, and $b^6$ is a valve for controlling the escape of air from the cylinder.

$b^7$ is a faucet for drawing off the contents of the cylinder.

C is a flume which has a gradual decline, as shown. C' is a trough leading into the flume and designed to conduct the lead-oxid product from cylinder B into said flume.

D is a spout receiving the flow from the flume.

E is a settling-tank receiving the flow from spout D.

$e\ e'$ are faucets for drawing off portions of the mixture within the tank.

F represents a horizontally-arranged cylinder or drum, of wood or metal, as desired, provided with axle-trunnions, by which it is journaled in the end standards $f\ f$, rotary motion being imparted to the cylinder by means of the sprocket-chain connections between one of the trunnions of the cylinder and the line-shaft X or in any suitable and well-known manner.

F' is a manhole in the circumference of the cylinder for access to the interior of the same and through which the supply of mixed lead oxid and water drawn off from settling-tank E can be introduced into the cylinder before the starting of the apparatus and while the cylinder is stationary. A faucet may be provided in the lower portion of the settling-tank E to draw off the lead oxid and water therefrom, and a trough may be provided for conducting the same into the cylinder F through the manhole F', or a suitable automatic feeding mechanism may be provided for the purpose. The interior of the cylinder may be provided with any stirring means that may be deemed necessary to carry out the process successfully.

$f'$ is a carbon-dioxid-induction pipe, and $f^2$ is an eduction-pipe, the trunnions of the cylinder being hollow to admit said pipes. The induction-pipe $f'$ communicates with a suitable compressor and carbon-dioxid generator, and the carbon dioxid is supplied to cylinder F under compression.

$f^3$ is a gage connected with $f'$.

$f^4$ is a valve for controlling the escape from eduction-pipe $f^2$.

$f^5$ is a faucet for drawing off the contents of the cylinder, and $f^6$ is a spout for receiving the flow from said cylinder and for conducting it to a waiting receptacle.

Suitable gages (not shown) may be employed to indicate the temperature prevailing within the reducer A and the cylinders B and F.

In carrying out the process a quantity of water is placed in the tub A, which we term the "reducer," (which supply may be introduced at the top portion thereof,) the coarse particles of lead are also placed therein, and in the operation of the complete mechanism the revolving of the rake $A^2$ will cause the coarse particles of lead in the course of time to be reduced to a comminuted state, and in such condition they will be held in suspension within the water, and in this condition they are conducted into cylinder B, which we call the "oxidizer," and in the operation of the complete mechanism the comminuted lead held in suspension in the water is subjected to a rolling or tumbling motion in the presence of atmospheric air, which is supplied continually during the revolution of the cylinder under compression therein, which ultimately results in the production of an oxid of lead. The length of time that the comminuted lead shall be subjected to the agitation and atmospheric-air influence may be regulated as desired, and the lead may be subjected to any desired degree of heat by any suitable mechanical means that may be provided during this step of the process to produce the particular character or kind of lead oxid that may be desired. When it is desired that the lead-oxid product from the oxidizer shall be used as the base for white lead, the product will be drawn off from the oxidizer while the cylinder is stationary and is caused to flow slowly through the flume C, and while flowing through said flume particles of metallic lead which have not been oxidized will settle to the bottom of the flume and the mixture of lead oxid and water flow into the settling-tank E, and the metallic lead that has been deposited in the bottom of the flume will be removed—that is, it is designed that it should be removed when a quantity of the same has accumulated in the bottom of the flume—and this metallic lead may be again placed within the reducer and again subjected to the steps of the process above enumerated. The mixture of lead oxid and water is allowed to stand within the settler E for a period of time, and the lead oxid will settle to the bottom portion of the tank, and a portion of the water remaining at the top will be drawn off, and the portion of the mixture remaining will be conducted from the settler into cylinder F, which we call the "carbonator," where the lead oxid, mixed with a sufficient quantity of water to enable it to be fully agitated, will be subjected to a rolling and tumbling motion during the rotation of the carbonator in the presence of carbon dioxid, which is supplied to the carbonator continually during the rotation thereof and under pressure therein, and while it is thus subjected to the carbon-dioxid influence, and as the mixture thickens on account of the carbon absorption, and as the temperature rises on account of chemical reaction of the process, water may be supplied to maintain the mixture in a suitable condition to be agitated and to maintain the desired temperature, such agitation and carbon-dioxid influence being continued until the lead oxid has been converted into lead carbonate, when it is drawn off from the carbonator and the lead-carbonate product is subjected to any suitable process that may be desired to abstract the water therefrom—that is, it may be dried, or it may be run through a separator of the rapidly-revolving kind, when the water or the greater portion thereof will be separated from the lead carbonate, which said lead carbonate may be mixed with oil and passed through the ordinary and well-known process of grinding, drying, &c., until it is finally reduced to a condition suitable for commercial use.

Having thus fully described our invention, what we claim, and desire to secure by Letters Patent, is—

1. The herein-described improvement in the art of making lead oxid and white lead, continuously, which consists in, first, reducing metallic lead by attrition and agitation in water, second, conducting the comminuted lead, mixed with water, into a separate vessel and therein subjecting the same to a rolling and tumbling motion in the presence of compressed air, third, settling the non-oxidized metallic lead and floating off the lead oxid, and then subjecting the lead oxid, mixed with water, to a further rolling and tumbling motion and to the action of carbon dioxid under pressure, substantially as specified.

2. In apparatus for making lead oxid and white lead, the combination of a rotary cylinder supported on hollow trunnions and provided with an inlet and an outlet, an induction-pipe for compressed air connected with one of the cylinder-trunnions and an eduction-pipe connected with the other trunnion, a flume to receive water and lead oxid from said cylinder, a settling-tank to receive the discharge from the flume, a rotary cylinder supported on hollow trunnions and arranged to receive lead oxid and water from the settling-tank, an induction-pipe for carbon dioxid connected with one of the trunnions of said cylinder and an eduction-pipe connected with the other trunnion, substantially as and for the purposes described.

3. In apparatus for making lead oxid and white lead, the combination of a reducing vessel or tub open at the top and provided with an outlet and with stationary and movable agitators, a rotary cylinder provided with an inlet and outlet and arranged to receive water and comminuted lead from the said reducing vessel, means for introducing compressed air into said cylinder, a flume to receive discharge of water and lead oxid from the said oxidizing-cylinder, a settling-tank to receive the discharge from said flume, a rotary cylinder arranged to receive water and lead oxid from said settling-tank, and means for introducing carbon dioxid under pressure into said last-named cylinder, substantially as and for the purposes described.

In testimony whereof we affix our signatures in presence of two witnesses.

WILLIAM E. S. BUNN.
ENSLEY J. CASE.

Witnesses:
W. V. TEFFT,
CHAS. W. LA PORTE.